United States Patent [19]

Johnson

[11] Patent Number: 4,622,494
[45] Date of Patent: Nov. 11, 1986

[54] SIGNALLING DEVICE

[76] Inventor: Robert M. Johnson, 4071 Sunnyslope Rd. SW., Port Orchard, Wash. 98366

[21] Appl. No.: 830,987

[22] Filed: Feb. 19, 1986

[51] Int. Cl.⁴ .............................................. B60Q 1/26
[52] U.S. Cl. ........................................ 315/77; 40/588; 40/591; 315/80; 340/74; 340/76
[58] Field of Search .................. 40/556, 591, 588; 315/77, 80; 340/74, 76, 93; 307/10 LS; 40/588

[56] References Cited

U.S. PATENT DOCUMENTS

| | | |
|---|---|---|
| 1,065,444 | 6/1913 | Greenberg . |
| 1,241,904 | 10/1917 | Baumgart . |
| 1,650,471 | 11/1927 | Servais . |
| 2,276,441 | 3/1942 | Warlick et al. . |
| 2,671,891 | 3/1954 | Kent . |
| 2,673,307 | 3/1954 | Weishuhn ............................ 315/77 |
| 2,836,913 | 6/1958 | Thomson et al. . |
| 3,060,407 | 10/1962 | Beiswenger ......................... 340/74 |
| 3,305,961 | 2/1967 | Lanzon et al. . |
| 3,802,103 | 4/1974 | Neff . |

FOREIGN PATENT DOCUMENTS 1528591  10/1978  United Kingdom .

Primary Examiner—Harold Dixon
Attorney, Agent, or Firm—Karen M. Gerken; Martin P. Hoffman; Mitchell B. Wasson

[57] ABSTRACT

An auxiliary signalling and warning device for utilization on vehicles which make wide turns comprising a main body section that is at least partially reflectorized and a light lens member that is adapted to be secured to the main body section so as to form an enclosure. The light lens member is provided with a written message indicating that the vehicle negotiates wide turns. Light bulb retaining means is provided in the main body section for receiving and retaining light bulbs. Electrical connections from the light bulbs are adapted to interact with the existing vehicle directional turn signal lights. The enclosure is adapted for mounting to the rear of the vehicle so as to provide a highly visible flashing warning to following traffic.

17 Claims, 5 Drawing Figures

SIGNALLING DEVICE

BACKGROUND OF THE INVENTION

1. Field of the Invention

The invention is directed to the dangers and problems presented by certain vehicles which, due to their length, must execute wide turns. Overlength and combination vehicles, such as semi-trailer and tractor units or truck and trailer units, are required to initiate turns from a location in the roadway that it well inside the curb lane of the road. This inherent feature of vehicles of exceptional length poses a grave danger for following traffic. Drivers are incapable of independently and immediately evaluating the length of other vehicles travelling on the road and, as such, are unable to appreciate the serious risk of collision created by turning overlength vehicles. In the United States, and other areas where ongoing traffic is by law required to utilize the right-hand lanes of a roadway, the risk of accident encountered when an overlength vehicle executes a right-hand turn is heightened, especially for traffic following in the curb lane. Thus, the need exists to warn and alert traffic travelling on our roadways of which vehicles are physically required to make wide turns. Such a warning allows other drivers to anticipate and avoid the danger created by overlength, wide-turning vehicles. An even more desperate need exists to not only warn of or identify those vehicles which must make wide turns, but to inform drivers of this fact prior to and simultaneously with the overlength vehicle's initiation of the turn. Following traffic, particularly curb lane traffic, will thereby be informed of the intention of the driver of the overlength vehicle to execute a turn and of the fact that said turn must necessarily be initiated from an interior lane of the roadway. Thus, many of the collisions resulting from the presence of large trucks on the roadways will be entirely prevented and avoided.

2. Description of the Prior Art

At present, many overlength vehicles bear a painted printed warning or a printed sign or decal indicating that the vehicle makes wide turns. This type of warning possesses little value in that it is seldom legible because it is usually covered with road dirt. Furthermore, a printed warning fails to definitively inform other drivers that the overlength vehicle executes wide turns when communication of the warning is most crucial, i.e. prior to and at the moment the overlength vehicle commences its turn. At best, the printed warnings currently utilized communicate to other drivers the fact that the overlength vehicle makes wide turns, but fail to relate the present intention of the vehicle to actually execute such a turn. The prior art also encompasses several patents directed to vehicle indicators or signalling devices. for example, U.S. Pat. No. 2,673,307 discloses a vehicle safety signalling device comprising a casing having multiple compartments within which lamps are disposed. The lamps are interconnected with a switch mounted on the instrument panel of the vehicle. similar vehicle lamps are disclosed in U.S. Pat. Nos. 1,065,444; 1,241,904; 1,650,471 and 2,671,891.

Several prior art patents also show signalling lamps which operate in conjunction with some other vehicle system. U.S. Pat. Nos. 2,276,441 and 2,836,913 disclose vehicle signalling devices operated through the vehicle's brake mechanism. U.S. Pat. No. 3,305,961 shows an illuminated signal adapted to be connected to the cigarette lighter of the vehicle. Finally, U.S. Pat. No. 3,802,103 discloses an advertising display that is illuminated when the ignition circuit of the vehicle is closed.

The prior art fails to disclose a flashing warning which is activated in conjunction with the existing directional turn signal system of the vehicle and which identifies the vehicle as one required to negotiate wide turns as well as indicating the contemplated direction of turning of the vehicle.

SUMMARY OF THE INVENTION

The invention is directed to a signalling device in the form of an auxiliary flashing warning light that is activated in conjunction with and simultaneously with the existing directional turn signals of a vehicle. The device is adapted to be mounted on the rear of a vehicle which, due to its increased length, must execute wide turns. The device is adapted to be mounted on the rear of the vehicle at approximately the same plane as the tail lights and is provided with a written or symbolic warning, or a combination thereof, indicating that the vehicle makes wide turns and the contemplated direction of turning.

The present signalling device comprises a light lens formed of plastic or glass and having molded thereon a plurality of translucent letters of amber color. The letters are provided so as to spell the term "WIDE TURN" or any other phrase suitable for communicating that the vehicle utilizing the device negotiates wide turns. The light lens may further be provided with translucent amber directional arrows located on either side of the printed matter and pointing toward the left and right so as to indicate the direction of turning of the vehicle. The light lens is secured to a generally rectangular box-like main body of metallic sheet material. A rubber gasket is provided between the light lens and the main body, thereby insuring a moisture and dust-proof union. The inner surfaces of the main body are reflectorized. A plurality of sockets are provided in the main body for receiving light bulbs. Electrical connections from the light bulbs interact with the left or right directional signal, or both, of the vehicle. Thus, the signalling device of the present invention is activated in conjunction with the vehicle's existing directional turn signal and appears as a flashing warning that identifies the vehicle as one required to make wide turns as well as the direction in which the vehicle intends to execute its wide turn.

A first alternative embodiment of the signalling device comprises a light lens having the essential message molded thereon and being secured to a rectangular main body. A rubber gasket separates the light lens from the main body, thereby providing an air-tight connection. A light holder having a plurality of sockets for receiving and retaining appropriate light bulbs is disposed within the main body. The main body includes a separate reflectorized back plate which is secured to the main body and is separated therefrom by a gasket. Electrical connections from the light bulb interact with the vehicle's existing directional signal system as was previously discussed.

DESCRIPTION OF THE PREFERRED EMBODIMENTS

Figure 1:
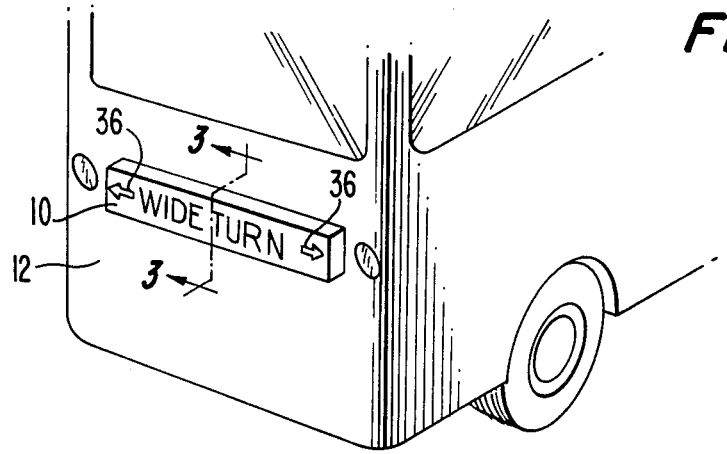
FIG. 1 illustrates the signalling device of the present invention as it appears when secured to the rear of a truck or other vehicle.

Referring to the drawings, and in particular to FIG. 1, there is shown an auxiliary signalling device 10 as contemplated by the present invention as it appears when mounted to the rear of a vehicle 12 such as a tractor trailer or truck trailer combination, bus or other overlength vehicle physically required to execute wide turns. The signalling device is mounted on the rear of such vehicle at approximately the same level as the vehicle tail lights, either in the center of the vehicle or toward the right side when viewed from the rear of the vehicle, so as to be prominently visible to traffic following the vehicle. The signalling device is adapted to provide a warning in the form of a flashing light anytime the left- or right-hand directional turn signal of the vehicle is utilized. The signalling device may be connected to the vehicle's existing directional turn signal system such that it is activated only for right turns or for both right and left turns. It is preferred that the signalling device be mounted in the center position of the rear of the vehicle when it is activated with either left or right turns and in the right quarter position of the rear of the vehicle when activated for right turns only.

Figure 2:
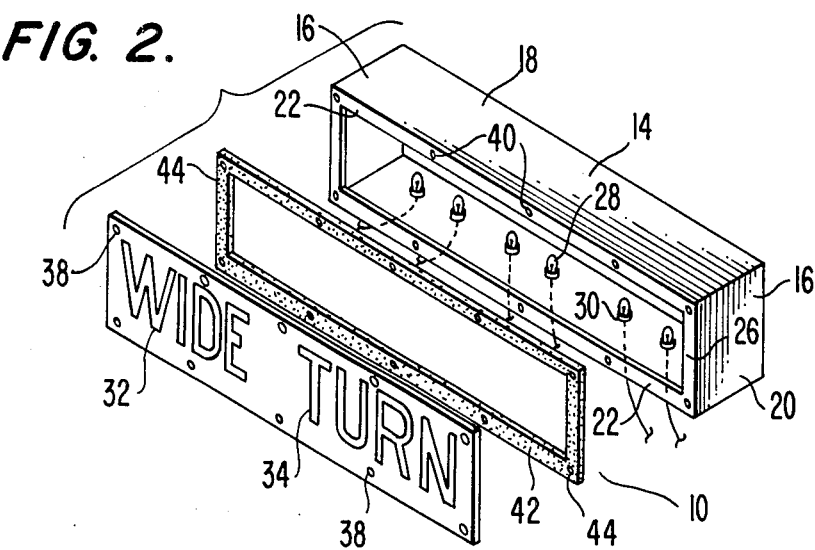
FIG. 2 is a perspective view of the signalling device of FIG. 1 depicting the arrangement of the parts.
Figure 3:
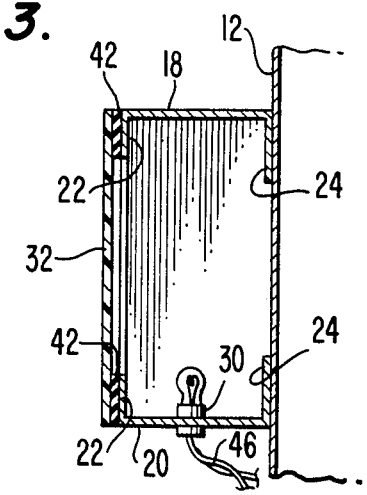
FIG. 3 is a view, taken along line 3—3, of the signalling device of FIG. 1.

A preferred embodiment of the signalling device is shown in FIGS. 2 and 3. As illustrated therein, the signalling device 10 comprises a generally rectangular main body section 14 having a pair of side walls 16 and upper and lower walls 18,20, respectively, which are perpendicular to the front and rear planes of the main body section. The main body section is preferably formed of a metallic, aluminum, steel or suitable synthetic sheet material. Inwardly bent flanges 22,24 extend, respectively, from the front and rear of the upper and lower walls 18,20 of the main body so as to lie in the front and rear planes. Side walls 16 are each provided at their front and rear with inwardly bent flanges 26 which lie in the main body section front and rear plane. All of the inner surfaces of the main body section are reflectorized. Lower wall 20 is formed with a plurality of sockets 28 adapted to receive and secure a plurality of light bulbs 30. When the signalling device is to be activated for right turns only, two or three light bulbs are required. For activation of the device with both left and right turns, four to six light bulbs are preferred.

The signalling device of FIGS. 2 and 3 further includes a rectangular light lens member 32 formed of plastic or glass and having molded therein a plurality of translucent letters 34 which are preferably of amber color. The letters 34 are provided so as to display the term "WIDE TURN" or any similar phrase suitable for communicating the message that the vehicle bearing the device negotiates wide turns. Each of the letters is approximately 3½ inches high by 2½ inches wide and having a body width of ¾ inch. The light lens member may additionally be provided with one or a pair of translucent amber directional arrows 36. When the signalling device is activated for right turns only, only one arrow pointing toward the right when viewed from the rear of the vehicle need be provided. When the signalling device is activated for both left- and right-hand turns, however, then an additional directional arrow pointing toward the left as viewed from the rear of the vehicle must be provided on the light lens member. The shape and dimensions of the light lens member are such that the configuration of the light lens member is the same as the rectangle defined by the front plane or surface of the main body section. A plurality of holes 38 is formed in the light lens member along the periphery thereof and are adapted to receive suitable securing means, such as screws or bolts (not shown) for attaching the light lens member to the main body section. For this purpose, a like plurality of holes 40 is provided in the front flanges 22 and 26 of main body section 14 such that holes 38 and 40 are in alignment when the light lens member is disposed adjacent the front surface of the main body section. A rectangular gasket 42 of rubberized or other appropriate material is adapted to be inserted between the light lens member and the main body section so as to achieve a moisture and dust-proof enclosure. Thus, a plurality of holes 44 is formed in the gasket to correspond with the size and location of holes 38 and 40. It is therefore possible to secure the light lens member to the front flanges 22 and 26 of the main body section by means of screws or bolts (not shown) extending through holes 38, 40 and 44.

The signalling device is mounted on the rear of the vehicle by means of screws or bolts (not shown). For this purpose, a plurality of holes (not shown) is provided along the periphery of the rear flanges. These holes are adapted to receive screws or bolts for securement to the vehicle. Electrical connections 46 extend from each of the light bulbs to the existing left and/or right directional lights of the vehicle 80 as to be operated simultaneously and in conjunction therewith. Therefore, when the appropriate turning signal is actuated in the normal manner by the driver of the vehicle, the bulbs 30 will automatically illuminate the enclosure formed by the light lens member and main body section so as to make highly visible the written message and/or arrow provided on the light lens member. The effectiveness of the signalling device is even more enhanced by the fact that bulbs 30 will flash intermittently in cadence with the vehicle turn signal light, thereby presenting a flashing warning that simply cannot escape the attention of following traffic.

Figure 4:
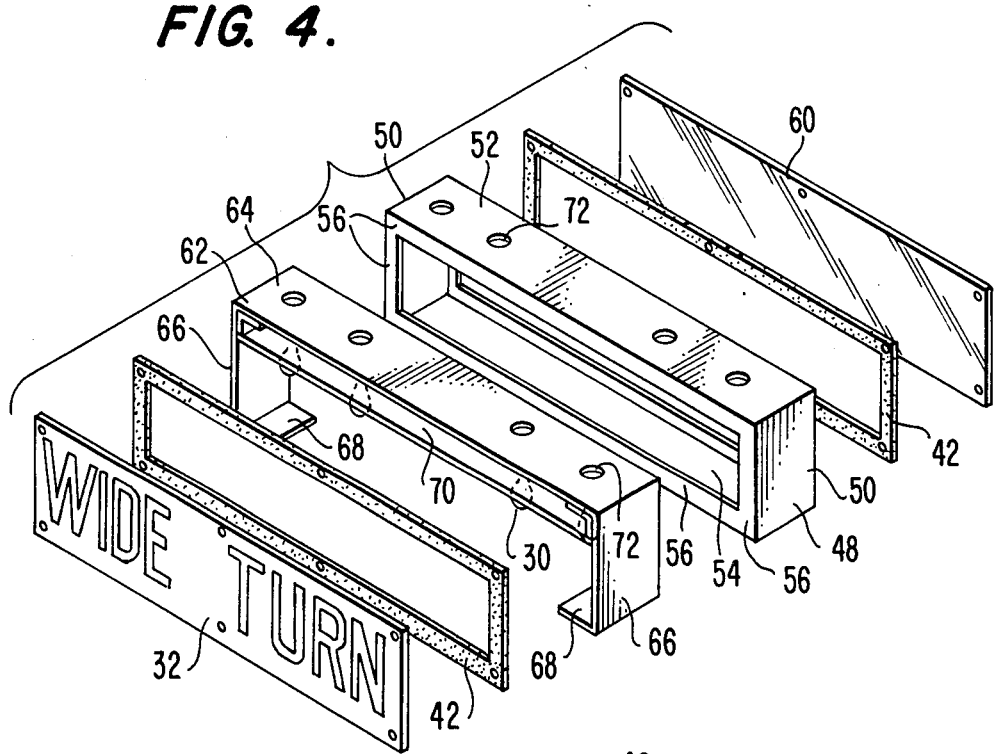
FIG. 4 is a perspective view of a first alternative embodiment of the signalling device of the present invention depicting the arrangement of the parts.
Figure 5:
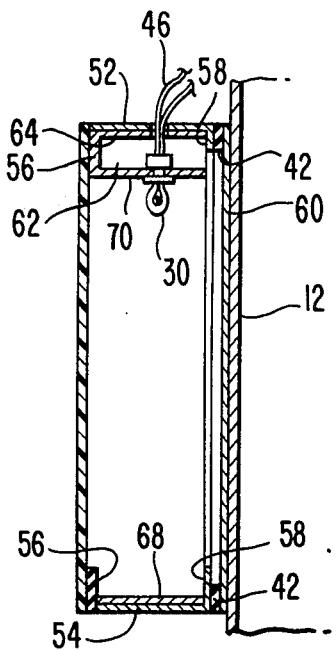
FIG. 5 is a side cross-sectional view of the signalling device of FIG. 4.

A first alternative embodiment for the instant invention is depicted in FIGS. 4 and 5. As illustrated therein, the signalling device comprises a generally rectangular main body section 48 having a pair of side walls 50 and upper and lower walls 52,54, respectively. Inwardly bent flanges 56,58 extend, respectively, from the front and rear of the upper and lower walls and from the front and rear of each of the side walls. A back plate 60 formed of or treated with reflectorized material is secured to the rear flanges and is separated therefrom by means of gasket 42. The gasket and the back plate are secured to the main body section as was discussed in connection with the securing of the light lens member to the main body section of FIGS. 1 and 2.

The signalling device of FIGS. 4 and 5 further includes a separate light bulb holder member 62 having an upper surface 64, a pair of side walls 66, a pair of inwardly bent lower flanges 68, and a plate 70, parallel to and disposed beneath the upper surface 64. Plate 70 is provided with a plurality of sockets for receiving and securing light bulbs 30. A like plurality of holes 72 is provided in the upper surface 64 of the light bulb holder as well as in the upper wall 52 of the main body section. The light bulb holder is adapted to be disposed within the main body section with light bulbs 30 being secured within the sockets. Electrical connections 46 from the light bulbs extend through aligned holes 72 in the upper surface of the light bulb holder and the upper wall of the main body section for connection to the vehicle directional lamps. A light lens member 32 identical to that of the embodiment of FIGS. 1 and 2 is secured through gasket 42 to front flanges 56 of the main body section as has been previously discussed in connection with FIGS. 1 and 2. As has also been previously discussed in connection with FIGS. 1 and 2, a plurality of holes (not shown) is provided on the rear flanges of the main body section for mounting the signalling device to the rear of a vehicle. A like plurality of holes is provided in the rear gasket and in the back plate so as to be in alignment with the holes in the rear flanges. These holes are adapted to receive screws or bolts for securement to the vehicle.

While the device described herein constitutes the preferred embodiments of the invention, it is to be understood that the invention is not to be limited to this precise form and that various modifications to the invention may be made without departing from its spirit and scope as defined in the appended claims.

What is claimed is:

1. An auxiliary signalling and warning device for utilization on vehicles which negotiate wide turns comprising a generally rectangular main body section having upper and lower walls, a pair of side walls, and a front and rear portion, said front portion being formed by a plurality of inwardly bent front flanges; at least one of the inner surfaces of said main body section being reflectorized; light bulb retaining means adapted to be provided within said main body section; a rectangular light lens member; said light lens member being provided with a written message; said written message indicating that the vehicle negotiates wide turns; said light lens member being adapted to be secured to said front portion of said main body section; said light lens member and said main body section together defining an enclosure; a rectangular front gasket adapted to be disposed between said light lens member and said front portion and securing means provided on said rear portion for mounting said enclosure onto the rear of a vehicle required to negotiate wide turns; said enclosure being adapted to be illuminated upon actuation of said vehicle's directional signal; said illumination flashing on and off in conjunction with said vehicle's directional signal.

2. An auxiliary signalling and warning device as recited in claim 1 wherein said light lens member is provided with at least one directional arrow.

3. The auxiliary signalling and warning device as recited in claim 1 wherein said main body section may be formed of metallic, aluminum, steel or synthetic sheet material.

4. The auxiliary signalling and warning device as recited in claim 1 wherein said light lens member may be formed of translucent plastic or glass material.

5. The auxiliary signalling and warning device as recited in claim 1 wherein said written message is formed of a plurality of suitable letters; said letters being molded integral with said light lens member; said letters being amber in color.

6. The auxiliary signalling and warning device as recited in claim 1 wherein said rear portion is formed by a plurality of inwardly bent rear flanges; said securing means provided on said rear portion comprising a plurality of holes formed in said rear flanges; said holes being adapted to be utilized for mounting said enclosure onto said vehicle.

7. The auxiliary signalling and warning device as recited in claim 1 wherein said rear portion comprises a plurality of inwardly bent rear flanges; a separable back plate adapted to be secured to said rear flanges; a rear rectangular gasket adapted to be disposed between said rear flanges and said back plate; said securing means provided on said rear portion including a like plurality of aligned holes formed in said rear flanges, in said second gasket and in said back plate; said holes being adapted to be utilized for mounting said enclosure onto said vehicle.

8. The auxiliary signalling and warning device as recited in claim 1 wherein said light bulb retaining means comprises a plurality of sockets formed in said lower wall of said main body section; said sockets being adapted to receive and retain light bulbs.

9. The auxiliary signalling and warning device as recited in claim 1 wherein said light bulb retaining means comprises a separable light bulb holder; said light bulb holder being defined by an upper surface, a pair of side walls and a pair of inwardly bent lower flanges; said light bulb holder being provided with a plate member; said plate member being parallel to and disposed beneath said upper surface; said plate member being provided with a plurality of sockets; said sockets being adapted to receive and retain light bulbs.

10. An auxiliary signalling and warning device for utilization on vehicles which negotiate wide turns comprising a generally rectangular main body section having upper and lower walls, a pair of side walls, and a front and rear portion; said front portion being formed by a plurality of inwardly bent front flanges; said rear portion being formed by a plurality of inwardly bent rear flanges; all of the inner surfaces of said main body section being reflectorized; a plurality of sockets formed in said lower wall and being adapted to receive and retain light bulbs; a rectangular light lens member; said light lens member being provided with a written message indicating that the vehicle negotiates wide turns; said written message being formed of a plurality of letters; said letters being molded integral with said light lens member: said letters being amber in color; said light lens member being adapted to be secured to said front flanges; a rectangular front gasket adapted to be disposed between said light lens member and said front flanges; said light lens member and said main body section together defining an enclosure and a plurality of holes formed in said rear flanges; said holes being adapted to be utilized for mounting said enclosure onto the rear of a vehicle required to negotiate wide turns; said enclosure being adapted to be illuminated upon actuation of said vehicle's directional signal; said illumination flashing on and off in conjunction with said vehicle's directional signal.

11. An auxiliary signalling and warning device as recited in claim 10 wherein said light lens member is provided with at least one directional arrow.

12. An auxiliary signalling and warning device as recited in claim 10 wherein said main body section may be formed of metallic, aluminum, steel or synthetic sheet material.

13. An auxiliary signalling and warning device as recited in claim 10 wherein said light lens member may be formed of translucent plastic or glass material.

14. An auxiliary signalling and warning device for utilization on vehicles which negotiate wide turns comprising a generally rectangular main body section having upper and lower walls, a pair of side walls, and a front and rear portion; said front portion being formed by a plurality of inwardly bent front flanges; said rear portion including a plurality of inwardly bent rear flanges; a separable back plate adapted to be secured to said rear flanges; a rear rectangular gasket adapted to be disposed between said rear flanges and said back plate; said back plate being reflectorized; a separable light bulb holder; said light bulb holder being defined by an upper surface, a pair of side walls and a pair of inwardly bent lower flanges; said light bulb holder being provided with a plate member; said plate member being parallel to and disposed beneath said upper surface; said plate member being provided with a plurality of sockets; said sockets being adapted to receive and retain light bulbs; said light bulb holder being adapted to be disposed within said main body section; a rectangular light lens member; said light lens member being provided with a written message indicating that the vehicle negotiates wide turns; said written message being formed of a plurality of letters; said letters being molded integral with said light lens member; said letters being amber in color; said light lens member being adapted to be secured to said front flanges; a front rectangular gasket adapted to be disposed between said light lens member and said front flanges; said light lens member and said main body section together defining an enclosure; a like plurality of holes formed in said rear flanges, in said rear gasket and in said back plate; all of said holes being in alignment; said holes being adapted to be utilized for mounting said enclosure onto the rear of a vehicle required to negotiate wide turns; said enclosure being adapted to be illuminated upon actuation of said vehicle's directional signal; said illumination flashing on and off in conjunction with said vehicle's directional signal.

15. An auxiliary signalling and warning device as recited in claim 14 wherein said light lens member is provided with at least one directional arrow.

16. An auxiliary signalling and warning device as recited in claim 14 wherein said main body section and said light bulb holder may be formed of metallic, aluminum, steel or synthetic sheet material.

17. An auxiliary signalling and warning device as recited in claim 14 wherein said light lens member may be formed of translucent plastic or glass material.

* * * * *